United States Patent
Witzig et al.

(10) Patent No.: US 6,667,667 B1
(45) Date of Patent: Dec. 23, 2003

(54) METHOD FOR DRIVING AT LEAST ONE INDUCTIVE LOAD USING PULSE WIDTH MODULATED CONTROL SIGNALS

(75) Inventors: Harald Witzig, Buehlertal (DE); Gerhard Knecht, Iffezheim (DE); Thomas Heese, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,386
(22) PCT Filed: May 17, 2000
(86) PCT No.: PCT/DE00/01538
 § 371 (c)(1),
 (2), (4) Date: Apr. 18, 2002
(87) PCT Pub. No.: WO00/70738
 PCT Pub. Date: Nov. 23, 2000

(30) Foreign Application Priority Data

May 19, 1999 (DE) .......................... 199 22 977

(51) Int. Cl.[7] .................................................. H03K 7/08
(52) U.S. Cl. .................... 332/109; 363/61; 363/140; 318/701; 318/254; 307/11
(58) Field of Search ................. 318/701, 254; 332/109; 363/61, 140; 307/11

(56) References Cited

U.S. PATENT DOCUMENTS 5,563,487 A  * 10/1996 Davis .......................... 318/701

FOREIGN PATENT DOCUMENTS

| DE | 24 51 477   | 5/1976  |
| DE | 197 25 708  | 1/1999  |
| EP | 0 911 956   | 4/1999  |
| JP | 59 106897   | 10/1984 |
| WO | WO 88/10367 | 12/1988 |

OTHER PUBLICATIONS

Patent Abstract of Japan, vol. 8, No. 226, Oct. 17, 1984.

* cited by examiner

*Primary Examiner*—Arnold Kinkead
(74) *Attorney, Agent, or Firm*—Kenyon & Kenyon

(57) ABSTRACT

A method for driving at least one inductive load using pulse width modulated control signals, via a PWM control unit, the control pulses of the PWM control signals connecting the load to and disconnecting it from a d.c. supply voltage via a semiconductor output stage. To prevent the formation of an a.c. voltage occurring on the d.c. supply voltage in the case of pulse-wise loading of the same by the PWM control signal, the PWM control unit is assignable a supplementary device including a storage capacitor and/or storage inductor having a semiconductor switch, and the semiconductor switch is controllable by the PWM control unit switch on one charging current circuit powered by the d.c. supply voltage for the storage capacitor and/or the storage inductor.

8 Claims, 2 Drawing Sheets

METHOD FOR DRIVING AT LEAST ONE INDUCTIVE LOAD USING PULSE WIDTH MODULATED CONTROL SIGNALS

FIELD OF THE INVENTION

The present invention relates to a method for driving at least one inductive load (consumer) using pulse width modulated control signals of a semiconductor output stage, the control pulses connecting the load to and disconnecting it from a d.c. supply voltage.

BACKGROUND INFORMATION

Electrical loads may be driven using pulse width modulated control signals in electrical or electronic circuits. In this context, the electrical load may be connected to or disconnected from a voltage source via a semiconductor switch, in correspondence with the pulse duty factor (control pulse to interpulse period).

If a plurality of loads driven by a pulse width modulated control signal are connected in a circuit, e.g., in the case of clocked output stages of electromotors in a motor vehicle, the result may be high starting (transient) current pulses and circuit-breaking (transient) current pulses that may result in an a.c. voltage superimposed on the d.c. supply voltage. This can already occur when large load currents are switched, and the d.c. supply voltage is not powerful enough, which is may be the case for batteries as vehicle electrical systems in motor vehicles. This a.c. voltage superimposed on the d.c. supply voltage may affect the functioning of all of the loads connected to the d.c. supply voltage.

German Published Patent Application No. 197 25 708 and Published PCT Application No. WO 88/10367 may indicate or refer to a method for driving electrical loads in which, when switching relatively large loads, they can be switched on and off with time displacement such that the current rises and decreases virtually continuously when switching on and off. As a result, the formation of an a.c. voltage superimposed on the d.c. supply voltage may only be weakened, yet may not be prevented in practice, particularly when the loads are inductive loads to which current is applied block-by-block, as may be the case for pulse width modulated, electronically commutable motors.

An excitation winding of such a motor may be driven via a circuit including two semiconductor switches and two diodes. Connected in parallel to the d.c. supply voltage is a capacitor that, after the switching off (operation), partially takes up the magnetic energy stored in the excitation winding. This capacitor forms a resonant circuit with the line inductance. When the motor is in operation, current is applied in succession to the excitation windings, a current limit being reached by clocking the semiconductor switch.

As a result of the magnetic energy stored in the excitation winding, the motor current then continues to flow in the free-running circuit, so that no additional current is taken up from the d.c. supply voltage. This "hard" switching on and off causes the current in the supply line and in the d.c. supply voltage to change particularly quickly and in a pulsed manner, which, due to the previously indicated resonant circuit among other things, results in the formation of an a.c. voltage superimposed on the d.c. supply voltage.

SUMMARY OF THE INVENTION

It is an object of the exemplary embodiment and/or exemplary method of the present invention to create a method for driving an inductive load using pulse width modulated control signals of the species recited at the outset that simply and inexpensively prevents the formation of an a.c. voltage superimposed on the d.c. supply voltage, or that keeps the amplitude of this a.c. voltage as low as possible.

According to the exemplary embodiment and/or exemplary method of the present invention, this object may be achieved in that a supplementary device including a storage capacitor and/or storage inductor including a semiconductor switch is allocated to the PWM control unit, and in that, in the interpulse periods of the PWM control signals, the semiconductor switch controlled by the PWM control unit energizes one charging current circuit powered by the d.c. supply voltage for the storage capacitor and/or the storage inductor.

In this driving (action), the d.c. supply voltage is additionally loaded in the interpulse periods by the charging current of the storage capacitor and/or of the storage inductor, so that only slow current changes, via which other loads connected to the d.c. supply voltage cannot be affected, can occur as a function of the power consumption at the d.c. supply voltage.

In this context, the charging current circuit can partially extend beyond both the start and end of the interpulse periods into the subsequent control pulses of the PWM control signals. This may result in improved load compensation of the d.c. supply voltage.

According to one exemplary embodiment and/or exemplary method, the charging current circuit can be adapted such that it takes up a charging current that is adjusted to the current of the load in such a manner that an approximately constant power requirement from the d.c. supply voltage results via the PWM operation.

If the exemplary embodiment and/or exemplary method is applied to electronically commutated motors, provision can be made according to one exemplary embodiment and/or exemplary method for one shared supplementary device including a storage capacitor and/or a storage inductor to be assigned, in an electronically commutable motor, to every semiconductor output stage having the loads configured as excitation windings, whose (the supplementary device's) semiconductor switch switches on the charging current circuit in all interpulse periods of all PWM control signals of the PWM control unit.

In this context, the driving (action) takes place such that the shared supplementary device has a storage inductor that is switched like the semiconductor output stages and the loads of the electronically commutated motor configured as excitation windings and can be driven by the PWM control unit, the semiconductor switch of this supplementary device switching on the storage inductor in every interpulse period of the PWM control signals, however.

In the case of an electronically commutated motor, the exemplary embodiment and/or exemplary method can be also carried out in such a manner that, for an electronically commutated motor, every semiconductor output stage having the loads configured as excitation windings is assigned its own supplementary device including a storage capacitor and/or storage inductor, and whose semiconductor switch only switches on the charging current circuit of the assigned supplementary device in the interpulse periods of the PWM control signals supplied to the semiconductor output stage, the charging current circuit being controlled such that every semiconductor output stage having the loads configured as excitation windings is assigned a storage capacitor as its own supplementary device, which can be switched via diodes and the appropriate semiconductor output stage in such a manner that it is charged in the interpulse periods of the supplied PWM control signals.

BACKGROUND INFORMATION

DETAILED DESCRIPTION

Figure 1:
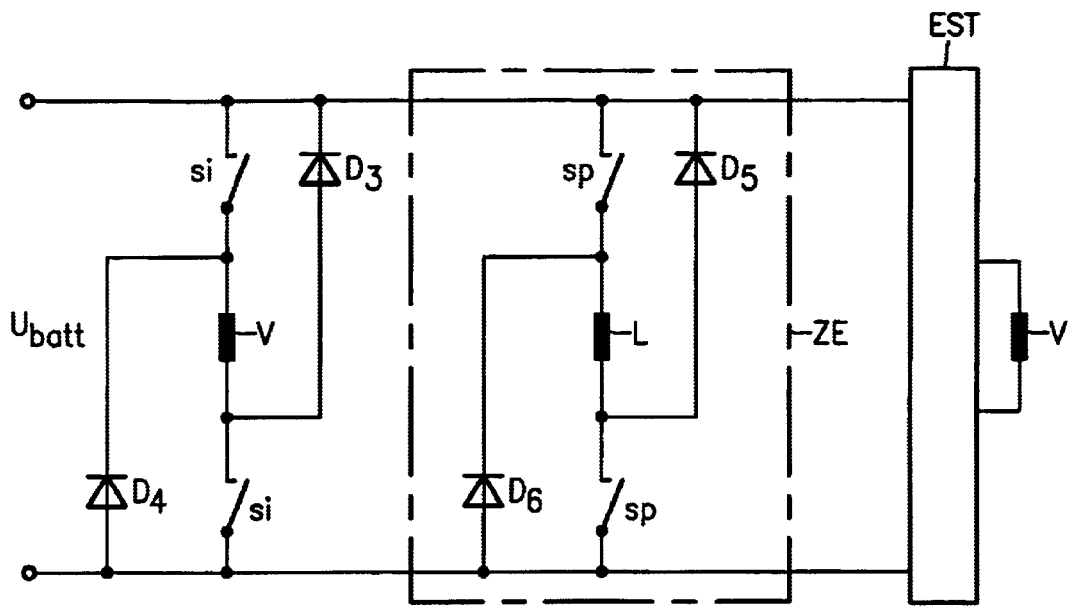
FIG. 1 shows a supplementary device including a storage inductor, which is assigned to an inductive load, which is excited by PWM control signals.
Figure 2:
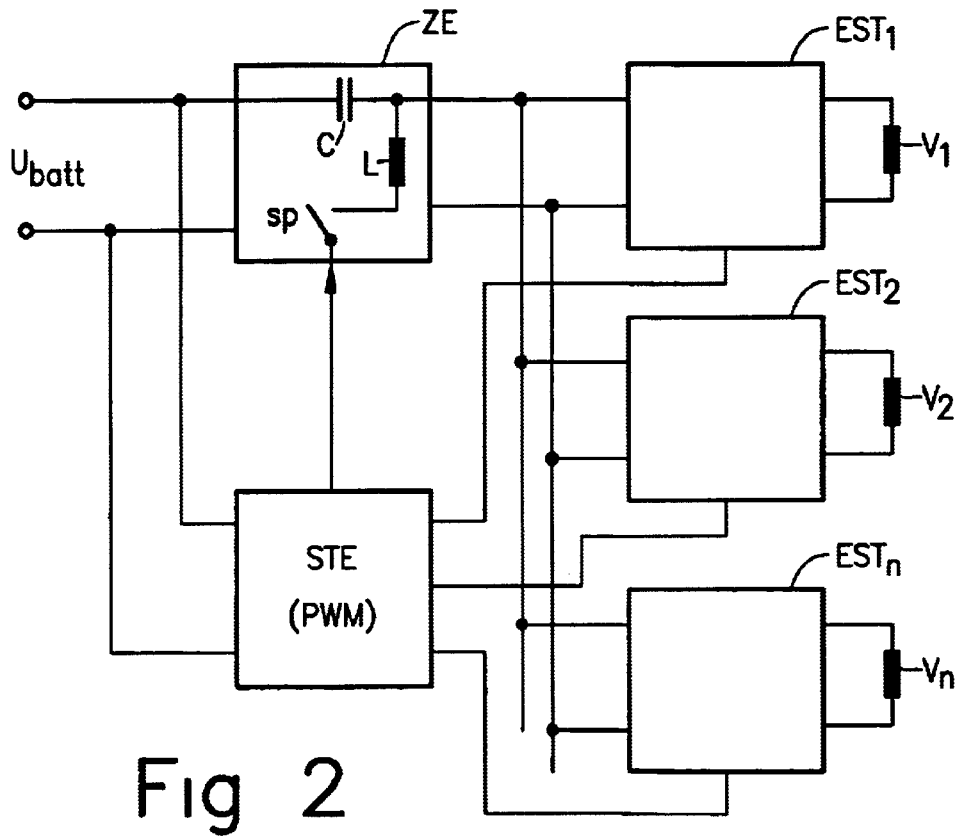
FIG. 2 shows an electronically commutated motor to which, a supplementary device shared by all semiconductor output stages and excitation windings is assigned.

As FIG. 1 shows, an inductive load V is excited via (final or basic) control elements si, using control pulses of a PWM control signal, the magnetic energy stored in load V being capable of running off in a known manner via diodes $D_3$ and $D_4$ in the interpulse periods and, in this context, temporarily maintaining the current flow in load V. In the interpulse periods of the PWM control signals, load V does not draw any current from d.c. supply voltage $U_{batt}$. In return, control elements sp configured as semiconductor switches direct storage inductor L in the interpulse periods into a charging current circuit, which is fed by d.c. supply voltage $U_{batt}$.

Control elements sp are part of the PWM control unit and are generally switched in a manner complementary to control elements Si of load V. If the power requirements for load V and storage inductor L are adjusted to one another such that the current taken up from d.c. supply voltage $U_{batt}$, is almost constant, no superimposed a.c. voltage occurs on d.c. supply voltage $U_{batt}$. Diodes $D_5$ and $D_6$ form a discharge circuit for the magnetic energy stored in storage inductor L when it is switched off. If load V is an excitation winding of an electronically commutated motor, storage inductor L does not participate in the torque production of the motor, i.e., it is situated outside of the engine.

If an electronically commutated motor exhibits excitation windings $V_1$ through $V_n$, they are excited in succession via assigned semiconductor output stages $EST_1$ through $EST_n$ as control elements, an electronic control unit STE driving semiconductor output stages $EST_1$ through $EST_n$ in succession, and the interpulse periods of the individual PWM control signals supplied to semiconductor output stages $EST_1$ through $EST_n$ being time-displaced with respect to one another.

Therefore, supplementary device ZE, including a storage capacitor C and/or a storage inductor L, shared by all semiconductor output stages $EST_1$ through $EST_n$ having the excitation windings as loads $V_1$ through $V_n$ must switch on the charging current circuit for loading d.c. supply voltage $U_{batt}$ via the supplementary device's semiconductor switch as control element sp in every interpulse period of the PWM control signals generated by control unit STE.

Figure 3:
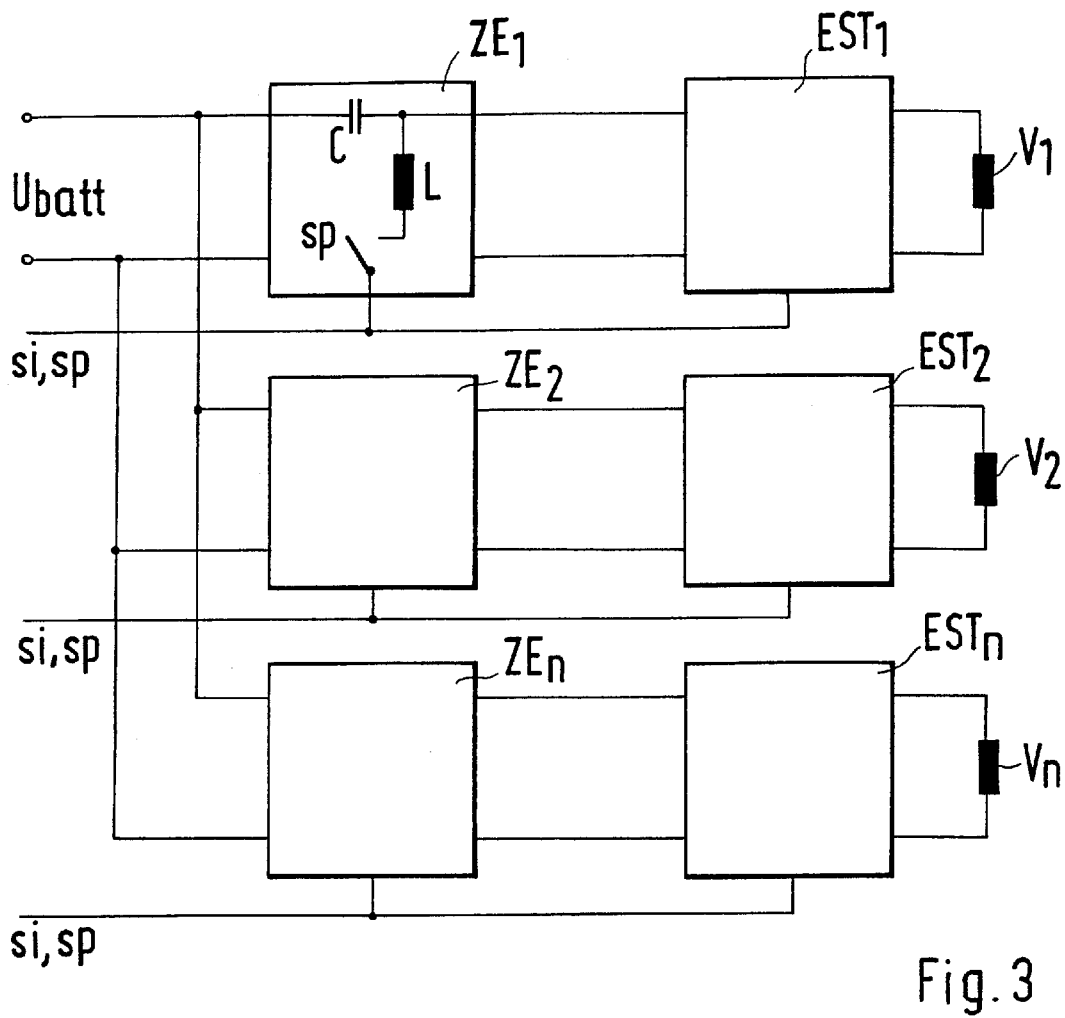
FIG. 3 shows an electronically commutated motor in which every semiconductor output stages having an excitation winding is assigned its own supplementary device.

As the exemplary embodiment of FIG. 3 shows, in an electronically commutated motor, every semiconductor output stage $EST_1$ through $EST_n$ having an excitation winding as loads $V_1$ through $V_n$ can be assigned its own supplementary device $ZE_1$ through $ZE_n$ including a storage capacitor C and/or a storage inductor L. Control elements sp of these supplementary devices $ZE_1$ through $ZE_n$ are again configured as semiconductor switches and switch the charging current circuits of supplementary devices $ZE_1$ through $ZE_n$ in a manner complementary to control elements si of control unit STE for semiconductor output stages $EST_1$ through $EST_n$, so that an almost constant loading of d.c. supply voltage $U_{batt}$ is then achieved.

In this context, as indicated, the current for semiconductor output stages $EST_1$ through $EST_n$ and loads $V_1$ through $V_2$ can be carried via the assigned supplementary devices $ZE_1$ through $ZE_n$, which are then ultimately connected in parallel to supply voltage $U_{batt}$. Control elements si for semiconductor output stages $EST_1$ through $EST_n$ and control elements sp for supplementary devices $ZE_1$ through $ZE_n$ are integrated in control unit STE.

Figure 4:
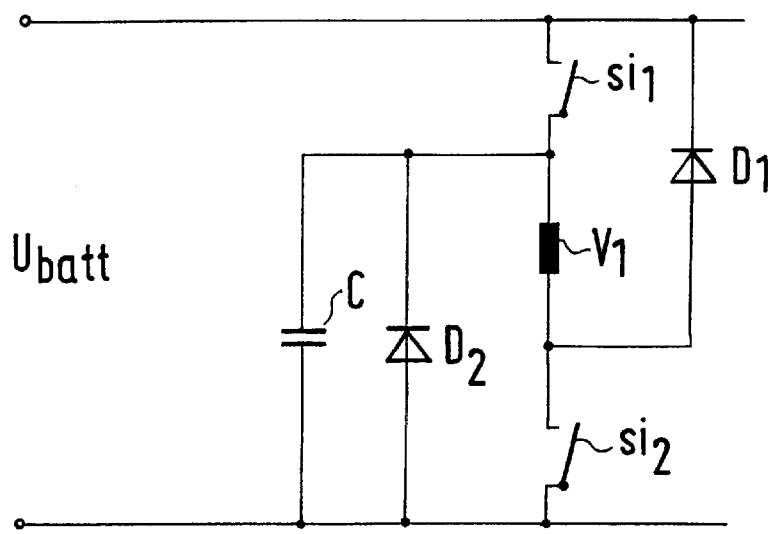
FIG. 4 shows a circuit in which a storage capacitor as a supplementary device is integrated in the driving circuit of the inductive load.

As FIG. 4 shows, a storage capacitor C can be directly incorporated into the circuit for load V. Load V is connected via two control elements configured as semiconductor switches $si_1$ and $si_2$ to d.c. supply voltage $U_{batt}$. In this context, load V can be an excitation winding of an electronically commutated motor. Storage capacitor C is connected between high-side control element sit and load V. Diodes $D_1$ and $D_2$ are used as discharging current circuits for the magnetic energy stored in load V after the excitation. Storage capacitor C can be loaded in the interpulse periods and forces the desired loading of d.c. supply voltage $U_{batt}$. In this context, low side control element $si_2$ must be open, which is the case in the interpulse periods.

The energy stored in storage capacitor C can be used for torque formation via the excitation winding provided that high side control element $si_1$ is opened first at the end of the control pulses. The energy stored in storage capacitor C then temporarily maintains the current flow through the excitation winding. Therefore, only one storage capacitor C is necessary per excitation winding, the storage capacitor's charging current being adjusted to the current consumption of the excitation winding in order to almost uniformly load d.c. supply voltage $U_{batt}$ while the motor is in operation.

What is claimed is:

1. A method for driving at least one inductive load using pulse width modulated (PWM) control signals of a PWM control unit, comprising:
    using control pulses of the PWM control signals to at least one of connecting and disconnecting the at least one inductive load to and from a d.c. supply voltage via a semiconductor output stage;
    assigning a supplementary device having at least one of a storage capacitor and a storage inductor and having a semiconductor switch to the PWM control unit; and
    controlling the semiconductor switch controlled by the PWM control unit in interpulse periods of the PWM control signals to switch on a charging current circuit powered by the d.c. supply voltage for the at least one of the storage capacitor and the storage inductor, the operation of the charging current circuit partially extends beyond a start and end of the interpulse periods into subsequent control pulses.

2. The method of claim 1, wherein the charging current circuit takes up a charging current that is adapted to the current of the at least one inductive load such that an approximately constant power requirement from the d.c. supply voltage results through PWM operation.

3. A method for driving at least one inductive load using pulse width modulated (PWM) control signals of a PWM control unit, comprising:
    using control pulses of the PWM control signals to at least one of connecting and disconnecting the at least one inductive load to and from a d.c. supply voltage via a semiconductor output stage;

assigning a supplementary device having at least one of a storage capacitor and a storage inductor and having a semiconductor switch to the PWM control unit; and controlling the semiconductor switch controlled by the PWM control unit in interpulse periods of the PWM control signals to switch on a charging current circuit powered by the d.c. supply voltage for the at least one of the storage capacitor and the storage inductor;

wherein for an electronically commutated motor, in the step of assigning, all semiconductor output stages, having loads configured as excitation windings, is assigned a shared supplementary device having the at least one of the storage capacitor and the storage inductor, the semiconductor switch being operable to switch on the charging current circuit in all interpulse periods of all PWM control signals of the PWM control unit.

4. A method for driving at least one inductive load using pulse width modulated (PWM) control signals of a PWM control unit, comprising:

using control pulses of the PWM control signals to at least one of connecting and disconnecting the at least one inductive load to and from a d.c. supply voltage via a semiconductor output stage;

assigning a supplementary device having at least one of a storage capacitor and a storage inductor and having a semiconductor switch to the PWM control unit; and controlling the semiconductor switch controlled by the PWM control unit in interpulse periods of the PWM control signals to switch on a charging current circuit powered by the d.c. supply voltage for the at least one of the storage capacitor and the storage inductor;

wherein for an electronically commutated motor, in the step of assigning, each of a plurality of semiconductor output stages having loads configured as excitation windings is assigned its own supplementary device having the at least one of the storage capacitor and the storage inductor, the semiconductor switch being operable to only switch on the charging current circuit of an assigned supplementary device in interpulse periods of the PWM control signals supplied to the semiconductor output stages.

5. The method of claim 3, wherein the shared supplementary device has a storage inductor, which is switched in a manner of the semiconductor output stages and the loads of the electronically commutable motor, configured as excitation windings, and which is drivable by the PWM control unit, the semiconductor switch of the shared supplementary device being operable to switch on the storage inductor in each of the interpulse periods of the PWM control signals.

6. The method of claim 5, wherein each of the semiconductor output stages having the loads configured as the excitation windings is assigned the storage capacitor as its own supplementary device, which can be switched via diodes and the assigned semiconductor output stage such that it is charged in the interpulse periods of the supplied PWM control signals.

7. The method of claim 3, wherein the charging current circuit takes up a charging current that is adapted to the current of the at least one inductive load such that an approximately constant power requirement from the d.c. supply voltage results through PWM operation.

8. The method of claim 4, wherein the charging current circuit takes up a charging current that is adapted to the current of the at least one inductive load such that an approximately constant power requirement from the d.c. supply voltage results through PWM operation.

* * * * *

UNITED STATES PATENT AND TRADEMARK OFFICE
CERTIFICATE OF CORRECTION

PATENT NO.    : 6,667,667 B1
DATED         : December 23, 2003
INVENTOR(S)   : Harald Witzig et al.

It is certified that error appears in the above-identified patent and that said Letters Patent is hereby corrected as shown below:

Column 1,
Lines 28 and 29, change "which is may be the case," to -- which may be the case --

Column 3,
Line 5, change "Background Information" to -- Brief Description of the Drawings --
Line 11, change "which, a supplementary" to -- which a supplementary --
Line 34, change "elements Si" to -- elements si --

Column 4,
Line 22, change "control element sit" to -- control element $Si_1$ --

Signed and Sealed this

Twenty-fifth Day of January, 2005

JON W. DUDAS
*Director of the United States Patent and Trademark Office*